United States Patent
Coussy

(10) Patent No.: US 12,313,501 B1
(45) Date of Patent: May 27, 2025

(54) METHOD FOR LEAK MONITORING A HIGH-PRESSURE VESSEL

(71) Applicant: Plastic Omnium New Energies France, Lyons (FR)

(72) Inventor: Emmanuel Coussy, Brussels (BE)

(73) Assignee: Plastic Omnium New Energies France, Lyons (FR)

( * ) Notice: Subject to any disclaimer, the term of this patent is extended or adjusted under 35 U.S.C. 154(b) by 0 days.

(21) Appl. No.: 18/955,433

(22) Filed: Nov. 21, 2024

(30) Foreign Application Priority Data

Nov. 23, 2023 (FR) ...................................... 2312970

(51) Int. Cl.
*G01M 3/20* (2006.01)
*F17C 9/02* (2006.01)

(52) U.S. Cl.
CPC .................. *G01M 3/20* (2013.01); *F17C 9/02* (2013.01); *F17C 2260/038* (2013.01)

(58) Field of Classification Search
CPC ........ G01M 3/20; F17C 9/02; F17C 2260/038
See application file for complete search history.

(56) References Cited

U.S. PATENT DOCUMENTS

2019/0232235 A1* 8/2019 Takahashi ................. C25B 9/73

FOREIGN PATENT DOCUMENTS

| EP | 2 677 313 A1 | 12/2013 |
| WO | 2015/078972 A1 | 6/2015 |

OTHER PUBLICATIONS

Search Report dated Jun. 19, 2024, issued in corresponding French patent application No. 2312970.
Written Opinion on the Patentability of the Invention dated Nov. 23, 2023, issued in corresponding French patent application No. 2312970.

* cited by examiner

*Primary Examiner* — David Z Huang
(74) *Attorney, Agent, or Firm* — Oblon, McClelland, Maier & Neustadt, L.L.P.

(57) ABSTRACT

A method for leak monitoring a high-pressure vessel includes the following steps: (a) pumping and compressing a liquefied gas via a pump from a source of liquefied gas so as to obtain a pressure of 500 to 1000 bar, (b) vaporizing the liquefied gas, (c) compressing a tracer gas to a pressure of 500 to 1000 bar, (d) mixing the vaporized liquefied gas obtained in step (b) with the compressed tracer gas obtained in step (c) in a buffer tank, (e) filling the high-pressure vessel to be monitored with the mixture obtained in step (d), then (f) checking for tracer gas leaks on the high-pressure vessel to be monitored.

12 Claims, 2 Drawing Sheets

[Fig. 1]
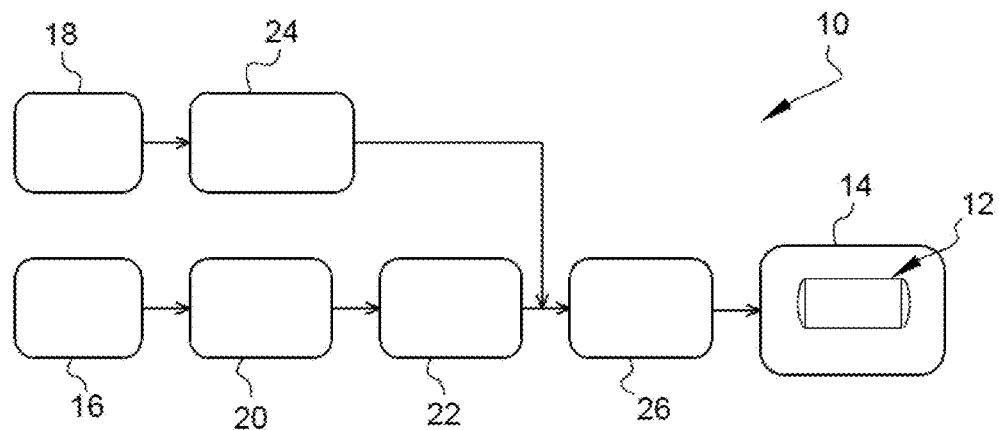
[Fig. 2]
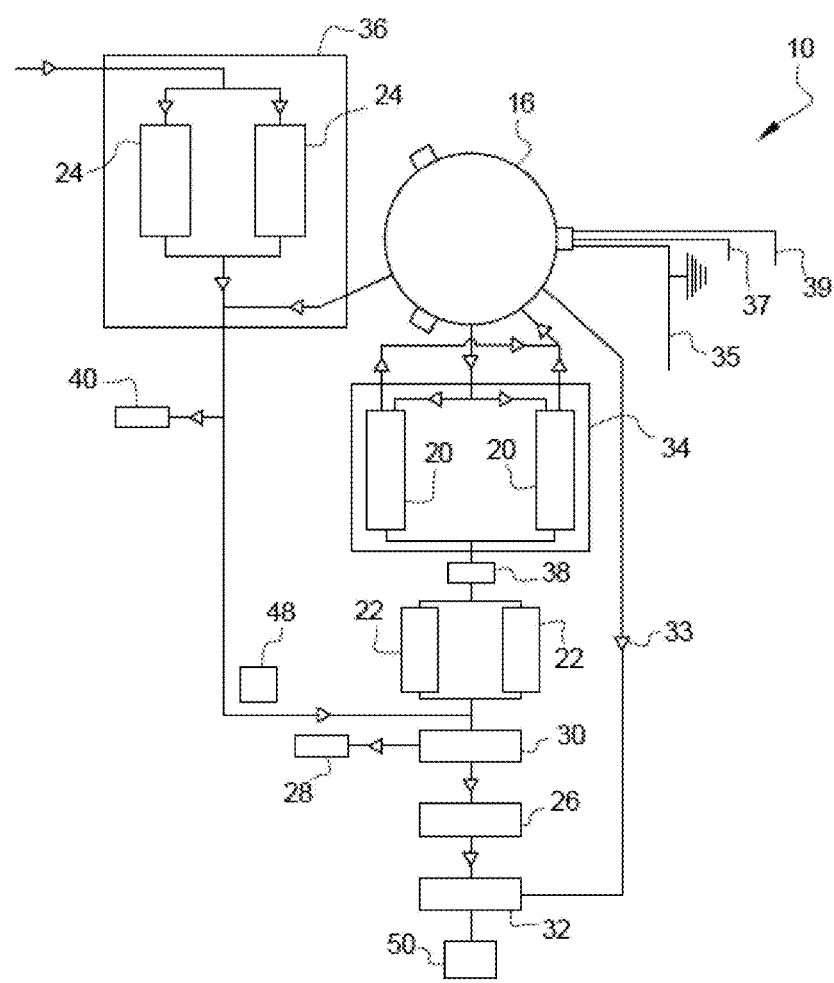

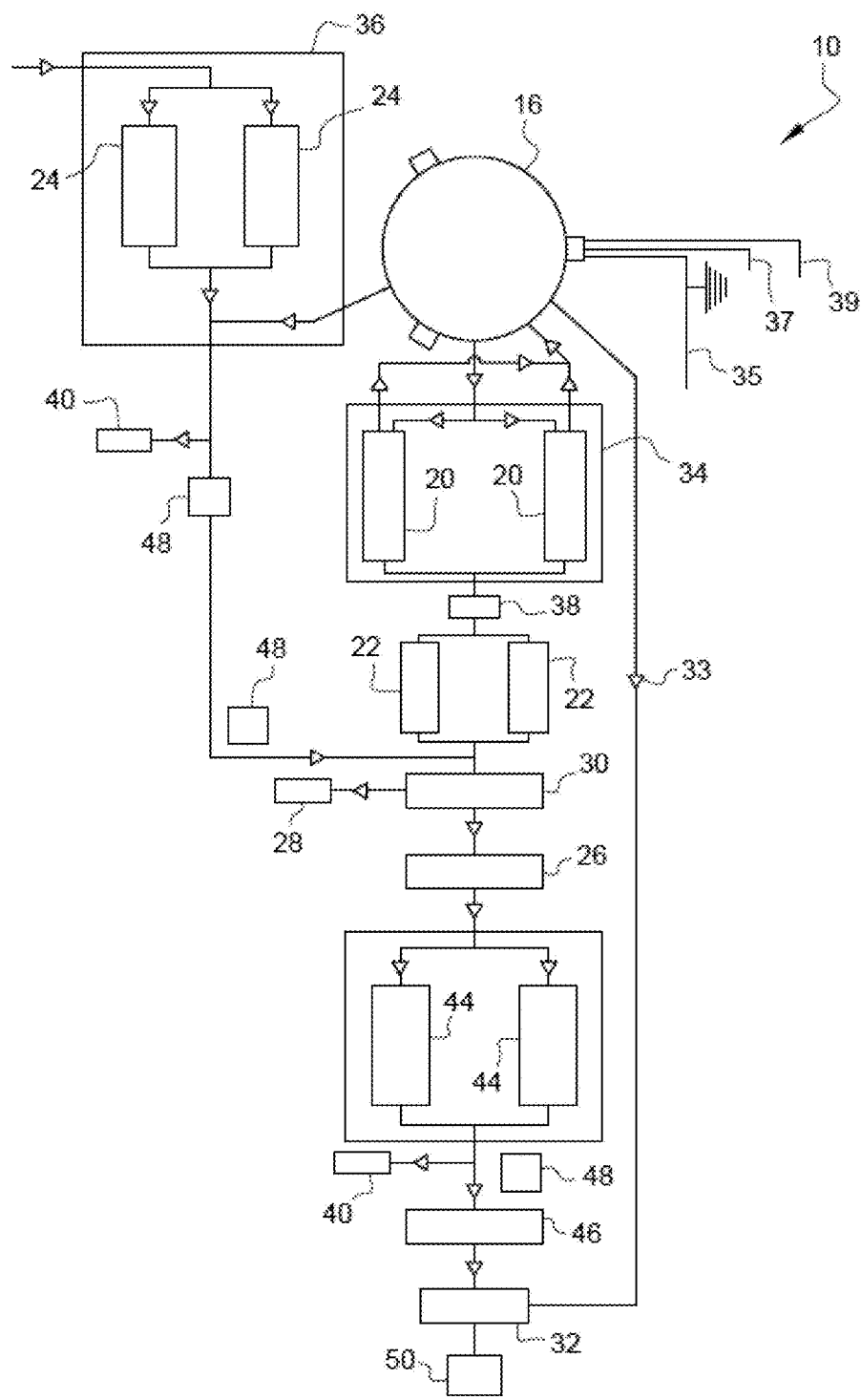
[Fig. 3]

METHOD FOR LEAK MONITORING A HIGH-PRESSURE VESSEL

The invention concerns a method for leak monitoring a high-pressure vessel at the end of a production line, in particular for motor vehicles, as well as a system for leak monitoring said high-pressure vessel at the end of a production line.

All high-pressure vessels must be monitored for leaks before being put into service. These leak monitorings are carried out during a gas leak test at the end of the production line. During this test, the vessel is placed in a fueling chamber and filled with a gas to a test pressure. The test pressure, that is, the pressure in the vessel at which the monitoring is carried out, is generally greater than or equal to the maximum working pressure, also known as the nominal pressure, of the vessel. The fueling chamber is equipped with sensors to detect any gas leak. The leak test is carried out at a filling temperature which must be below 85° C. and above −40° C. The gas used is generally a mixture comprising 5% by weight $H_2$ (dihydrogen, commonly known as hydrogen) and 95% by weight $N_2$ (dinitrogen, commonly known as nitrogen), wherein hydrogen is used as the tracer gas. Hydrogen can be replaced by helium. Tracer gas is used to detect a leak using a spectrometer.

A gas leak test using a gaseous source of nitrogen and a gaseous source of hydrogen is already known. Such a test requires the use of series of gas compressors, series of heat exchangers to monitor compressor inlet temperature, and valves to monitor compressor inlet pressure. Such a test therefore consumes a great deal of energy and is very costly. Furthermore, it is a complex method, involving many different stages.

One of the aims of the invention is to provide a less energy-intensive method of leak monitoring a high-pressure vessel.

To this end, the invention relates to a method for leak monitoring a high-pressure vessel. The method comprises the following steps:
a) pumping and compressing a liquefied gas by means of a pump from a source of liquefied gas, so as to obtain a compressed liquefied gas at a pressure ranging from 500 to 1000 bar, then
b) vaporizing the compressed liquefied gas obtained in step a) to obtain a vaporized liquefied gas,
c) compressing a tracer gas to obtain a compressed tracer gas at a pressure ranging from 500 to 1000 bar,
d) mixing the vaporized liquefied gas obtained in step b) with the compressed tracer gas obtained in step c) in a buffer tank to obtain a gas mixture,
e) filling the high-pressure vessel to be monitored with the gas mixture obtained in step d), then
f) checking for a tracer gas leak on the high-pressure vessel to be monitored.

By pumping and vaporizing gas in liquefied rather than gaseous form, there's no need to use a series of gas compressors, a series of heat exchangers and a series of pressure-control valves. The result is a less energy-intensive and less costly method.

It should be noted that a buffer tank is advantageously used to mix the vaporized liquefied gas with the compressed tracer gas, whereas it would have been conceivable to administer the tracer gas directly into the vessel to be monitored, and mix the vaporized liquefied gas with the tracer gas in the vessel to be monitored. However, although compression of the tracer gas would not have been necessary, and there would have been no need for a buffer tank, the proposed method is particularly safe.

"Buffer tank" preferably is understood as a tank whose volume is such that it can fill several high-pressure vessels to be monitored. Thus, with the buffer tank, only one gas mixture is needed to monitor several high-pressure vessels. Without the buffer tank, as many gas mixtures would have to be made as there are vessels, which is more restrictive.

Moreover, by multiplying the number of separate mixes to be made, the difficulty of obtaining a mix of the quality required for leak monitoring each time is multiplied.

The quality of the gas mixture is determined by the proportion of each gas in the gas mixture. A gas mixture of the required quality is one wherein the proportion of each gas present in the gas mixture conforms to a target proportion. Thanks to the buffer tank, it is not necessary to equip each vessel to be monitored with means to check the quality of the gas mixture. As a result, the system is simpler and the method less time-consuming.

Furthermore, if the tracer gas is hydrogen, this is a flammable gas, so the risk of fire or explosion has to be managed, making the leak monitoring even more complex. By mixing the hydrogen with the liquefied gas in the buffer tank, we avoid having to manage these risks at each high-pressure vessel to be monitored.

Thus a test is provided that requires less complex and safer system.

According to other optional features of the leak monitoring method, taken either alone or in combination:
The pump includes a cold head. The pump cold head is the part of the pump that serves as the inlet and outlet for the liquefied gas.
The pump is a cryogenic pump, also known as a cryopump.
This makes it possible to compress a liquefied gas having a negative temperature.
The cryogenic pump is a cryogenic piston pump.
The high-pressure vessel is designed to be filled with a gas at a maximum filling pressure of 875 bar. An example is a type IV high-pressure vessel, comprising a liner surrounded by a reinforcing structure, with a maximum working pressure, also known as nominal pressure, of 700 bar.
The high-pressure vessel is designed to contain high-pressure hydrogen.
The vaporized liquefied gas is mixed with the compressed tracer gas in the buffer tank at a pressure ranging from 500 to 1000 bar.
Test pressure ranges from 350 to 700 bar.
The liquefied gas is liquid nitrogen. This gas has the advantage of being inexpensive, and its use does not involve the same risks as hydrogen, such as the risk of generating an explosive atmosphere.
The liquefied nitrogen is pumped from a source of liquefied nitrogen
at a pressure of around 10 bar, for example a liquefied nitrogen storage tank pressurized to a pressure of less than 15 bar, for example 10 bar.
Liquefied nitrogen is pumped and compressed using a cryogenic pump capable of operating at temperatures as low as −253° C.
The tracer gas can be either hydrogen or helium, helium being more expensive than hydrogen but less dangerous.

Advantageously, the mixture of vaporized liquefied gas with tracer gas is a mixture containing a proportion ranging from 95% to 96% by weight of nitrogen and from 4% to 5% by weight of hydrogen. Alternatively, the gas mixture is one containing a proportion ranging from 95 to 98% by weight of nitrogen and 2 to 5% by weight of helium.

The liquefied gas is pumped and compressed so as to obtain a compressed liquefied gas at a pressure ranging from 900 to 1000 bar, preferably around 1000 bar, and the tracer gas is compressed so as to obtain a compressed tracer gas at a pressure ranging from 900 to 1000 bar, preferably around 1000 bar. This means there is no need to compress the gas mixture before filling the vessel to be monitored, and it is directly at the desired pressure.

The liquefied gas is pumped and compressed so as to obtain a compressed liquefied gas at a pressure of approximately 500 bar, the tracer gas is compressed so as to obtain a compressed tracer gas at a pressure of approximately 500 bar, the method comprises, before step e) of filling the high-pressure vessel to be monitored with the gas mixture obtained in step d):

a step of compressing the gas mixture obtained in step d) to a pressure of around 1000 bar.

Before step e) of filling the high-pressure vessel to be monitored with the gas mixture obtained in step d), the method includes a step of cooling said gas mixture, preferably via a heat exchanger itself cooled by liquefied gas flowing from the liquefied gas source.

This controls the gas mixture temperature required for filling the high-pressure vessel, which must remain between −40° C. and 85° C. The liquefied gas source is thus advantageously used for cooling the gas mixture.

After step b) of vaporizing the liquefied gas and before step d) of mixing the gas in the buffer tank, the method comprises a step of cooling the vaporized liquefied gas, preferably by injecting liquefied gas from the liquefied gas source into the vaporized liquefied gas.

This cools the vaporized liquefied gas.

Liquefied gas flows from the liquefied gas source to a cold head of the pump.

In this way, the liquefied gas source is used to cool the pump.

Liquefied gas can be circulated to the pump's cold head using a thermosiphon system.

Prior to step d) of mixing the gases in the buffer tank, the method includes a step of dosing each gas obtained in steps b) and c) so as to control the proportion of each gas in the gas mixture. Preferably, this control is continuous.

To obtain a gas mixture with the required quality, the proportion of each gas is controlled during the injection of each gas into the buffer tank. Preferably, the proportion of each gas is controlled by a mass flow meter which measures the mass flow rate of each gas during its injection into the buffer tank. A dosing device is also provided for each gas. The dosing device is controlled by the mass flowmeters as a function of the mass flow measurements taken. In this way, the proportion of each gas present in the gas mixture obtained in step d) is controlled, preferably continuously.

The invention also relates to a system for implementing a method for leak monitoring a high-pressure vessel, comprising:
a fueling chamber,
a pump configured to pump and compress a liquefied gas at a pressure ranging from 500 to 1000 bar,
a vaporizer,
a compressor configured to compress a tracer gas to a pressure ranging from 500 to 1000 bar,
a buffer tank.

The system comprises at least one pump, at least one vaporizer and at least one compressor.

In this way, maintenance operations can be carried out without having to stop the production line.

According to other optional features of the system, taken alone or in combination:

The system comprises two pumps configured to pump and compress
the liquefied gas to a pressure ranging from 500 to 1000 bar, and/or comprises two compressors configured to compress the tracer gas to a pressure ranging from 500 to 1000 bar, and/or comprises two vaporizers.

In this way, maintenance operations can be carried out without having to stop the production line.

A cold head of the pump includes a device for circulating liquefied gas from the liquefied gas source.

The system also includes a gas analyzer located downstream of the buffer tank and upstream of the high-pressure vessel to be monitored. In this way, the proportion of each gas in the gas mixture leaving the buffer tank is continuously controlled.

The system further comprises a pipe for injecting liquefied gas from the liquefied gas source into the vaporized liquefied gas, which is preferably a vaporizer bypass line.

This cools the vaporized liquefied gas. A cooled liquefied gas is therefore injected into the buffer tank, lowering the temperature of the gas mixture to be injected into the vessel to be monitored.

BRIEF DESCRIPTION OF THE FIGURES

The invention will be better understood upon reading the following description, which is provided merely as example and with reference to the appended drawings, wherein:

FIG. 1 is a schematic view of a system according to the invention for implementing a leak monitoring method.

FIG. 2 shows schematically the flow of fluids in the leak monitoring method according to a first embodiment of the invention.

FIG. 3 shows schematically the flow of fluids in the leak monitoring method according to a second embodiment of the invention.

DETAILED DESCRIPTION

In the figures, elements similar to those in other figures are designated by identical references.

FIG. 1 shows a schematic view of a system for implementing a leak monitoring method, designated by the general reference 10. In the system 10 shown, a high-pressure vessel 12 can be monitored for leaks. The system 10 comprises a fueling chamber 14 wherein the high-pressure vessel 12 is placed in order to be filled with a gas up to a test pressure. The fueling chamber 14 is equipped with sensors (not shown) to detect any gas leakage. FIG. 1 also shows a source 16 of liquefied gas and a source 18 of tracer gas. The system 10 also includes a pump 20 configured to pump and compress the liquefied gas to a pressure ranging from 500 to 1000 bar, a vaporizer 22, a compressor 24 configured to compress the tracer gas to a pressure ranging from 500 to 1000 bar, and a buffer tank 26. The liquefied gas is stored at a pressure of 10 bar in the liquefied gas source 16. In one example, the source 16 of liquefied gas is a tank containing liquefied gas. Pump 20 pumps a liquefied gas at a pressure of 10 bar, and compresses it to a pressure of 500 to 1000 bar. Pump 20 is a cryogenic pump with a cold head, not shown.

The monitoring method according to the invention comprises the following steps:
a) pumping and compressing liquefied gas by means of pump 20 from source 16 of liquefied gas, so as to obtain compressed liquefied gas at a pressure ranging from 500 to 1000 bar,
b) vaporizing the compressed liquefied gas obtained in step a) to obtain a vaporized liquefied gas,
c) compressing the tracer gas to produce a compressed tracer gas at a pressure of 500 to 1000 bar,
d) mixing the vaporized liquefied gas obtained in step b) with the compressed tracer gas obtained in step c) in the buffer tank 26 to obtain a gas mixture,
e) filling the high-pressure vessel 12 to be monitored with the gas mixture obtained in step d), then
f) checking for a tracer gas leak on the high-pressure vessel 12 to be monitored.

In the system 10 shown in FIG. 1:
step a) is carried out at pump 20,
step b) is carried out at vaporizer 22,
step c) is carried out at compressor 24,
the checking for gas leaks in step f) is carried out in the fueling chamber 14.

Preferably, step c) is carried out after steps a) and b), although it may be carried out before or at the same time as step a) and/or step b).

In the example shown in FIG. 1, the high-pressure vessel 12 is designed to contain high-pressure hydrogen. The vaporized liquefied gas is mixed with the compressed tracer gas in the buffer tank 26, for example, at a pressure ranging from 500 to 1000 bar. The liquefied gas is, for example, nitrogen. The mixture of vaporized liquefied gas with tracer gas can be a mixture containing from 95% to 96% by weight nitrogen and from 4% to 5% by weight hydrogen.

In general, before step d) of mixing the gases in the buffer tank (26), there is a dosing step for each gas obtained in steps b) and c), so as to control the proportion of each gas in the gas mixture. Preferably, this control is carried out by a mass flow meter 28, preferably continuously.

FIG. 2 schematically shows the flow of fluids in the leak monitoring method according to a first embodiment of the invention. In this embodiment, the pump 20 is configured to pump and compress the liquefied gas at a pressure ranging from 900 to 1000 bar, and the compressor 24 is configured to pump and compress the tracer gas at a pressure ranging from 900 to 1000 bar. The liquefied gas is pumped and compressed to produce a compressed liquefied gas at a pressure of 900 to 1000 bar, and the tracer gas is compressed to produce a compressed tracer gas at a pressure of 900 to 1000 bar. In this embodiment, the vaporized liquefied gas is mixed with the compressed tracer gas in the buffer tank 26 at a pressure of 900 to 1000 bar. The system 10 shown in part in FIG. 2 also includes a gas analyzer 50 located downstream of the buffer tank 26 and upstream of the high-pressure vessel to be monitored, not shown in FIG. 2. Thus, after step d) of mixing the gas in the buffer tank 26 and before step e) of filling the vessel 12 to be monitored with the gas mixture obtained in step d), the quality of the gas mixture obtained in step d) is monitored. Gas analyzer 50 is a chromatograph, for example. Monitoring gas proportion is managed by a gas mixture control panel 30. FIG. 2 also shows a heat exchanger 32 located near the system 10. Heat exchanger 32 is itself cooled by liquefied gas flowing from liquefied gas source 16, as shown by arrow 33. Thus, the method according to this embodiment comprises, prior to step e) of filling the control vessel 12 with the gas mixture obtained in step d), a step of cooling the gas mixture via heat exchanger 32. Thus the temperature is monitored of the gas mixture required for filling the high-pressure vessel, which must remain between −40° C. and 85° C. In this way, the liquefied gas source 16 is advantageously used to cool the gas mixture.

The system 10 shown in FIG. 2 comprises two pumps 20 configured to pump and compress the liquefied gas to a pressure of 900 to 1000 bar, two compressors 24 configured to compress the tracer gas to a pressure of 900 to 1000 bar, and two vaporizers 22. The pumps 20 are mounted on a pump skid 34, and the two compressors 24 are mounted on a compressor skid 36. Also shown is a control panel 38 for the vaporizers 22. Thanks to the presence of two pumps 20, two compressors 24 and two vaporizers 22, maintenance operations can be carried out without having to stop the production line. In fact, in each pair of devices, one of the two devices is redundant, that is, one is used while the other is switched off. In this way, when a device has to be shut down for a maintenance operation, for example, the redundant device is put into service to take over from the shut-down device, thus avoiding stopping the production line during a maintenance operation.

In FIG. 2, the liquefied gas source 16 comprises a grounding system 35, a 3G link 37 and a power supply 39. Grounding 35 relates to the entire system 10. In the example where the source 16 of liquefied gas is a tank containing liquefied gas, the level of liquefied gas in the tank is measured by a sensor, for example a pressure sensor. The 3G link is a mobile Internet link that enables the liquefied gas supplier to be informed of the level of liquefied gas in the tank, in order to plan a refill of the tank when the level reaches a predetermined threshold, for example when the level reaches 20% of the tank's nominal capacity.

When system 10 starts up, the cold head of pump 20 is at ambient temperature. To ensure proper operation of pump 20, the cold head is brought to its optimum operating temperature (−196° C. for liquid nitrogen). To achieve this, the cold head is supplied with sub-cooled liquefied gas (in the case of liquid nitrogen, this is liquid nitrogen brought to a temperature below −196° C.) by means of a sub-cooling device, not shown.

In this way, the liquefied gas source is advantageously used to sub-cool the cold head of the pump 20 to ensure that the pump 20 operates correctly when the system 10 is started up.

The system 10 shown in FIG. 2 also includes a pipe, not shown, for injecting liquefied gas from the liquefied gas source 16 into the vaporized liquefied gas. Thus, in this example, after step b) vaporizing the liquefied gas and before step d) mixing the gas in the buffer tank 26, the method comprises a step of cooling the vaporized liquefied gas by injecting liquefied gas from the liquefied gas source 16 into the vaporized liquefied gas.

The system 10 shown in FIG. 2 also includes a gas analyzer 40 at the outlet of the compressor 24. The analyzer 40 detects the presence of hydrocarbons in the compressed gas, such as oil if the compressor 24 is lubricated.

FIG. 3 schematically illustrates the flow of fluids in the leak monitoring method according to a second embodiment of the invention. In this embodiment, pump 20 is configured to pump and compress liquefied gas at a pressure of around 500 bar, and compressor 24 is configured to pump and compress tracer gas at a pressure of around 500 bar. The liquefied gas is pumped and compressed to produce a compressed liquefied gas at a pressure of around 500 bar, and the tracer gas is compressed to produce a compressed tracer gas at a pressure of around 500 bar. In this embodiment, the vaporized liquefied gas is mixed with the compressed tracer gas in the buffer tank 26 at a pressure of around 500 bar. The system shown in FIG. 3 also includes a compressor 44 capable of compressing the gas mixture stored in the buffer tank 26 to a pressure of around 1000 bar. In this embodiment, the method also comprises, prior to step e) of filling the high-pressure vessel 12 to be monitored with the gas mixture obtained in step d), a step of compressing the gas mixture obtained in step d) so as to obtain a compressed gas mixture at a pressure of around 1000 bar. The gas mixture, compressed to around 1000 bar, is then stored in a storage tank 46. From this storage tank 46, in step e) the high-pressure vessel to be monitored is filled. The system 10 shown in FIG. 3 comprises two compressors 44, one of which is redundant, like the two compressors 24. One of the compressors 44 is operated while the other is stopped.

The facilities 10 shown in FIGS. 2 and 3 also include particle and oil filters 48 for system maintenance.

The invention is not limited to the embodiments presented, and other embodiments will become clearly apparent to the person skilled in the art. In particular, it is possible to use a tracer gas other than hydrogen, such as helium. It is also possible to use another liquefied gas.

LIST OF REFERENCES

- 10: system
- 12: high-pressure vessel
- 14: fueling chamber
- 16: liquefied gas source
- 18: tracer gas source
- 20: pump
- 22: vaporizer
- 24: compressor
- 26: buffer tank
- 28: mass flow meter
- 30: gas mixture control panel
- 32: heat exchanger
- 33: liquefied gas circulation
- 34: pump skid
- 35: grounding
- 36: compressor skid
- 37: 3G link
- 38: vaporizer control panel
- 39: power supply
- 40: gas analyzer
- 44: 400 to 1000 bar compressor
- 46: storage tank
- 48: particulate and oil filter
- 50: gas analyzer

The invention claimed is:

1. A method of leak monitoring a high-pressure vessel, wherein the method comprises the following steps:
   a) pumping and compressing a liquefied gas via a pump from a source of liquefied gas, so as to obtain a compressed liquefied gas at a pressure ranging from 500 to 1000 bar,
   b) vaporizing the compressed liquefied gas obtained in step a) to obtain a vaporized liquefied gas,
   c) compressing a tracer gas to obtain a compressed tracer gas at a pressure ranging from 500 to 1000 bar,
   d) mixing the vaporized liquefied gas obtained in step b) with the compressed tracer gas obtained in step c) in a buffer tank to obtain a gas mixture e) filling the high-pressure vessel to be monitored with the gas mixture obtained in step d), then f) checking for a tracer gas leak on the high-pressure vessel to be monitored.

2. The leak monitoring method according to claim 1, wherein the liquefied gas is pumped and compressed so as to obtain a compressed liquefied gas at a pressure ranging from 900 to 1000 bar, preferably around 1000 bar, and the tracer gas is compressed so as to obtain a compressed tracer gas at a pressure ranging from 900 to 1000 bar, preferably around 1000 bar.

3. The leak monitoring method according to claim 1, wherein the liquefied gas is pumped and compressed so as to obtain a compressed liquefied gas at a pressure of about 500 bar, the tracer gas is compressed so as to obtain a compressed tracer gas at a pressure of about 500 bar, the method comprises before step e) of filling the high-pressure vessel to be monitored with the gas mixture obtained in step d):
   a step of compressing the gas mixture obtained in step d) so as to obtain a compressed gas mixture at a pressure of around 1000 bar.

4. The leak monitoring method according to claim 1, comprising prior to step e) of filling the high-pressure vessel to be monitored with the gas mixture obtained in step d), a step of cooling said gas mixture, preferably via a heat exchanger itself cooled by liquefied gas flowing from the source of liquefied gas.

5. The leak monitoring method according to claim 1, comprising after step b) of vaporizing the liquefied gas and before step d) of gas mixing in the buffer tank, a step of cooling the vaporized liquefied gas, preferably by injecting liquefied gas from the liquefied gas source into the vaporized liquefied gas.

6. The leak monitoring method according to claim 1, wherein liquefied gas flows from the liquefied gas source to a cold head of the pump.

7. The leak monitoring method according to claim 1, comprising prior to step d) of mixing gases in the buffer tank, a step of dosing each gas obtained in steps b) and c) so as to control the proportion of each gas in the gas mixture.

8. A system for carrying out a method for leak monitoring a high-pressure vessel according to claim 1, comprising:
   a fueling chamber,
   a pump configured to pump and compress a liquefied gas at a pressure ranging from 500 to 1000 bar,
   a vaporizer,
   a compressor configured to compress a tracer gas to a pressure ranging from 500 to 1000 bar,
   a buffer tank.

9. The system according to claim 8, comprising two pumps configured to pump and compress the liquefied gas to a pressure ranging from 500 to 1000 bar, and/or comprising two compressors configured to compress the tracer gas to a pressure ranging from 500 to 1000 bar, and/or comprising two vaporizers.

10. The system according to claim 8, wherein a cold head of the pump comprises a device for circulating liquefied gas from the source of liquefied gas.

11. The system according to claim 8, further comprising a gas analyzer arranged downstream of the buffer tank and upstream of the high-pressure vessel to be monitored.

12. The system according to claim 8, further comprising a pipe for injecting liquefied gas from the liquefied gas source into the vaporized liquefied gas.

* * * * *